(12) United States Patent
Tajima

(10) Patent No.: US 10,137,800 B2
(45) Date of Patent: Nov. 27, 2018

(54) POWER FEEDING DEVICE AND CONTACT POWER FEEDING SYSTEM

(71) Applicant: HONDA MOTOR CO., LTD., Tokyo (JP)

(72) Inventor: Takamitsu Tajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 180 days.

(21) Appl. No.: 15/115,526

(22) PCT Filed: Jan. 5, 2015

(86) PCT No.: PCT/JP2015/050032
§ 371 (c)(1),
(2) Date: Jul. 29, 2016

(87) PCT Pub. No.: WO2015/115121
PCT Pub. Date: Aug. 6, 2015

(65) Prior Publication Data
US 2017/0166084 A1  Jun. 15, 2017

(30) Foreign Application Priority Data
Jan. 31, 2014 (JP) ................. 2014-016827

(51) Int. Cl.
*B60M 1/30* (2006.01)
*B60L 5/36* (2006.01)
(Continued)

(52) U.S. Cl.
CPC ............. *B60M 1/30* (2013.01); *B60L 5/36* (2013.01); *B60L 11/1827* (2013.01);
(Continued)

(58) Field of Classification Search
CPC ...... B60L 5/36; B60L 5/38; B60L 5/39; B60L 5/40; B60L 5/42; B60M 1/30; B60M 1/307; B60M 1/04; B60M 1/34
(Continued)

(56) References Cited

U.S. PATENT DOCUMENTS 2,086,611 A * 7/1937 Frank .................. H02G 5/04
191/23 R
3,280,245 A * 10/1966 Rodeseike ............ B60M 1/305
174/171

(Continued)

FOREIGN PATENT DOCUMENTS

| JP | 48-30335 Y1 | 9/1973 |
| JP | 2013-60095 A | 4/2013 |
| JP | 2013-233037 A | 11/2013 |

OTHER PUBLICATIONS

International Search Report dated Mar. 24, 2015, issued in counterpart International Application No. PCT/JP2015/050032 (1 page).

*Primary Examiner* — Mark T Le
(74) *Attorney, Agent, or Firm* — Westerman, Hattori, Daniels & Adrian, LLP

(57) ABSTRACT

A power feeding device which constitutes a contact power feeding system is provided with a pair of insulator parts which support respective suspended wires, and a bracket which includes a pair of holding plates to which the respective insulator parts are secured. The bracket is formed such that a contact surface of one suspended wire with respect to a charging arm is directed obliquely upward to a traveling road side and a contact surface of the other suspended wire with respect to the charging arm is directed obliquely downward to the traveling road side.

11 Claims, 6 Drawing Sheets

(51) Int. Cl.
*H02J 7/00* (2006.01)
*B60L 11/18* (2006.01)

(52) U.S. Cl.
CPC ............... *B60M 1/307* (2013.01); *H02J 7/00* (2013.01); *B60L 2230/10* (2013.01); *Y02T 10/7005* (2013.01); *Y02T 10/7088* (2013.01); *Y02T 90/121* (2013.01); *Y02T 90/125* (2013.01); *Y02T 90/14* (2013.01)

(58) Field of Classification Search
USPC ................. 191/29 R, 30, 31, 32, 22 R, 23 R
See application file for complete search history.

(56) References Cited

U.S. PATENT DOCUMENTS 3,475,568 A * 10/1969 Dehn ....................... B60M 1/04
  191/35
3,880,264 A *  4/1975 Corkum ................... B60L 5/38
  191/45 R \* cited by examiner

POWER FEEDING DEVICE AND CONTACT POWER FEEDING SYSTEM

TECHNICAL FIELD

The present invention relates to an electrical power supplying device (a power feeding device) and a contact type electrical power supplying system (a contact power feeding system), for supplying power in a contact manner to a pair of power receiving elements that are disposed on a charging arm that extends outwardly in a vehicle transverse direction from an electric vehicle.

BACKGROUND ART

Conventionally, a contact type electrical power supplying system is known in which, during traveling of an electric vehicle, charging of an energy storage device of the electric vehicle is performed by bringing a pair of power receiving elements of a charging arm that extends outwardly in a vehicle transverse direction from the electric vehicle into contact with a pair of power lines of the electrical power supplying device.

For example, as disclosed in Japanese Utility Model Publication No. 48-030335, a contact type electrical power supplying system has been proposed, in which a pair of upper and lower power receiving elements of a charging arm of an electric vehicle are brought into contact with a pair of power lines, by use of an electrical power supplying device equipped with a guard rail and a pair of upper and lower power lines, which are disposed in a pair of upper and lower recessed parts of the guard rail, such that flat contact surfaces thereof are oriented in a horizontal direction with respect to the power receiving elements. With such a contact type electrical power supplying system, in order to suppress positional shifting in a vertical direction (upper and lower directions) between the respective power lines and the respective power receiving elements due to unevenness of a road surface or the like, a structure is adopted in which a guide roller, which is disposed on an upper side charging arm, is placed in contact with a side surface of the upper side recessed part.

Further for example, as disclosed in Japanese Laid-Open Patent Publication No. 2013-233037, a contact type electrical power supplying system has been proposed, in which a pair of power receiving elements provided on a single charging arm of an electric vehicle are brought into contact with a pair of power lines, using an electrical power supplying device, which is equipped with a power line retaining unit in which a V-shaped groove is formed that extends along a travel path of the electric vehicle and opens toward the side of the travel path, and the pair of power lines, which are fixed in respective groove side surfaces of the V-shaped groove.

SUMMARY OF INVENTION

However, with the contact type electrical power supplying system disclosed in Japanese Utility Model Publication No. 48-030335, because there is a need to provide a guide roller on the upper side charging arm from among the pair of upper and lower charging, arms, together with forming the pair of upper and lower recessed parts in the guide rail, the charging device and the charging arms become larger in size and complex in structure.

In contrast thereto, with the contact type electrical power supplying system disclosed in Japanese Laid-Open Patent Publication No. 2013-233037, since the Pair of power lines, which are fixed to the respective groove side surfaces of the V-shaped groove of the power line retaining unit, and the pair of power receiving elements provided in the single charging arm are kept in contact, positional shifting in a vertical direction of the power receiving elements with respect to the power lines can be suppressed, even without providing the aforementioned complex positional shifting suppression structure (i.e., the guide roller and the recessed parts of the guard rail, etc.). Therefore, the pair of power receiving elements can reliably be kept in contact with the pair of power lines without causing an increase in the size and complexity of the electrical power supplying device and the charging arm. However, with an electrical power supplying device of this type, because there is a need for the power line retaining unit that extends along the travel path to be constituted from an insulating material, there is a concern that a rise in manufacturing costs may occur.

The present invention has been devised taking into consideration the aforementioned problems, and has the object of providing an electrical power supplying device and a contact type electrical power supplying system, in which a pair of power receiving elements can be reliably kept in contact with a pair of power lines without causing an increase in the size and complexity of the electrical power supplying device and the charging arm, together with enabling a reduction in manufacturing costs.

An electrical power supplying device according to the present invention supplies power in a contact manner to a pair of power receiving elements of a charging arm that extends outwardly in a vehicle transverse direction from an electric vehicle, the electrical power supplying device comprising a pair of power lines configured to extend along a travel path of the electric vehicle in a state enabling contact with the power receiving elements, and electrical power being supplied to the power lines, a pair of insulators configured to retain the respective power lines, and a base member containing a pair of retaining plates to which the respective insulators are fixed, and being disposed on an opposite side from the travel path with respect to the pair of power lines, wherein the base member is formed to ensure an insulating distance between the pair of power lines, and to orient a contact portion of one of the power lines with respect to the charging arm in an upwardly inclined manner toward the side of the travel path, and to orient a contact portion of another of the power lines with respect to the charging arm in a downwardly inclined manner toward the side of the travel path.

According to the electrical power supplying device of the present invention, because the contact portion of one of the power lines is oriented in an upwardly inclined manner toward the side of the travel path, and the contact portion of the other of the power lines is oriented in a downwardly inclined manner toward the side of the travel path, it is possible for the pair of power lines and the pair of power receiving elements to be brought into contact by entry of the charging arm between the pair of power lines. More specifically, in a state in which the pair of power lines and the pair of power receiving elements are in contact, in the case that the electric vehicle is vibrated in a vertical direction due to unevenness of the travel path, it is possible for positional shifting in the vertical direction of the power receiving elements with respect to the power lines to be suppressed, without especially providing a complex positional shifting suppression mechanism. More specifically, the pair of power receiving elements can reliably be kept in contact with the pair of power lines without causing an increase in the size and complexity of the electrical power supplying device and the charging arm. Further, due to the fact that the power lines are retained at predetermined positions while the respective power lines and the base member are insulated electrically by the insulators, since there is no need for the insulators to extend at the same length along the power lines, manufacturing costs can be reduced.

In the aforementioned electrical power supplying device, a plane of one of the retaining plates may be oriented in an upwardly inclined manner toward the side of the travel path, and a plane of another of the retaining plates may be oriented in a downwardly inclined manner toward the side of the travel path.

In accordance with such a configuration, with a simple structure, the contact portion of one of the power lines can be oriented in an upwardly inclined manner toward the side of the travel path, together with the contact portion of the other of the power lines being oriented in a downwardly inclined manner toward the side of the travel path.

In the above-described electrical power supplying device, there may further be provided a protective member configured to isolate the pair of power lines and a space on an opposite side from the travel path with respect to the electrical power supplying device, the protective member further comprising a vertical wall positioned more on an outer side of the travel path than the pair of power lines, and configured to be extended in a vertical direction, a lower side wall configured to extend from the vertical wall downwardly of the pair of power lines, and an upper side wall configured to extend from the vertical wall upwardly of the pair of power lines.

In accordance with such a structure, since the pair of power lines are isolated by the protective member from the space on the opposite side from the travel path with respect to the electrical power supplying device, safety of the road that is disposed within the space can be ensured.

In the above-described electrical power supplying device, an upper surface of the upper side wall may be inclined in a downwardly inclined manner toward the outer side of the travel path.

In accordance with such a configuration, rainwater that adheres to the upper surface of the upper side wall can be guided and discharged in a direction toward the road. Consequently, rusting of the power lines due to rainwater, and deterioration in the insulating capability between the respective components can be prevented.

In the above-described electrical power supplying device, the protective member may include a projecting wall configured to project in at least one of upward and downward directions from an end of the upper side wall on a side of the travel path.

In accordance with such a structure, since the projecting wall is provided on an end of the upper side wall on the side of the travel path, the space on the opposite side from the travel path with respect to the electrical power supplying device and the power lines can reliably be isolated from each other (contact by the hands or the like into the power line from the space can be prevented), and together therewith, infiltration of rainwater into the power lines and parts in the vicinity thereof can be suppressed.

In the above-described electrical power supplying device, there may further be provided a guard rail including a support post on which the protective member is supported, and being disposed along the power lines.

In accordance with this configuration, the vehicle that travels along the travel path coming into contact with the power lines can be prevented by the guard rail. Further, since the protective member is supported by the support post of the guard rail, there is no need for a member apart from the guard rail itself to support the protective member. Thus, the structure of the electrical power supplying device can further be simplified.

In the above-described electrical power supplying device, there may further be provided guide members configured to guide the pair of power receiving elements of the charging arm toward the pair of power lines.

In accordance with such a configuration, since the power receiving elements in a pair are guided to the pair of power lines by the guide members, the power receiving elements and the power lines can easily and reliably be brought into contact.

A contact type electrical power supplying system according to the present invention is characterized by an electric vehicle including a charging arm in which a pair of power receiving elements are disposed, and which extends outwardly in a vehicle transverse direction, and an electrical power supplying device configured to supply electrical power in a contact manner to the pair of power receiving elements.

In accordance with the present invention, because the contact portion of one of the power lines is oriented in an upwardly inclined manner toward the side of the travel, path, and the contact portion of the other of the power lines is oriented in a downwardly inclined manner toward the side of the travel path, it is possible for the pair of power lines and the pair of power receiving elements to be reliably brought into contact without causing an increase in the size and complexity of the electrical power supplying device and the charging arm. Further, since the respective power lines are supported in the base member through the insulators, manufacturing costs can be reduced.

DESCRIPTION OF EMBODIMENTS

Below, a Preferred embodiment of a contact type electrical power supplying system, which is equipped with an electrical power supplying device according to the present invention, will be described in detail with reference to the accompanying drawings.

Figure 1:
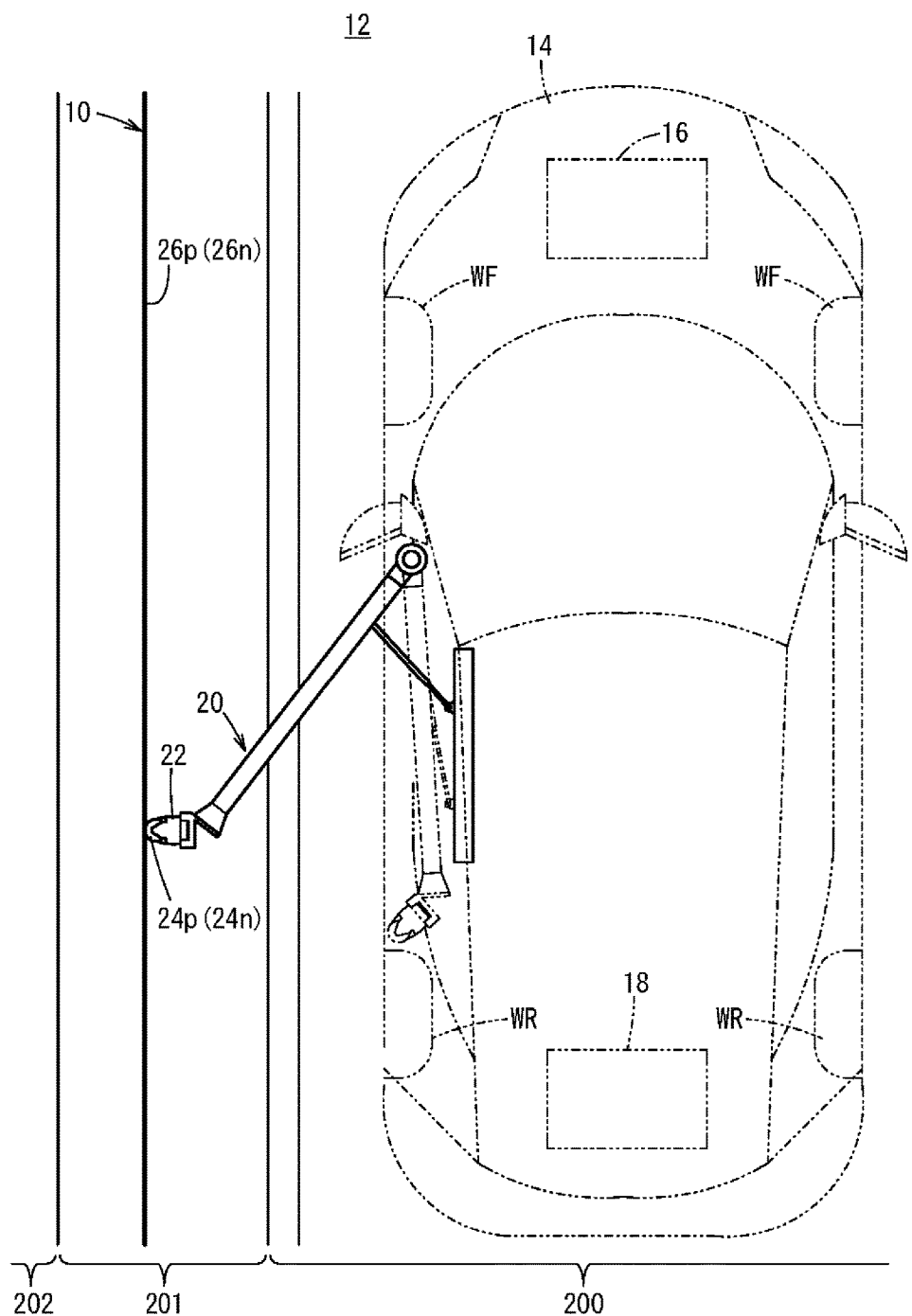
FIG. 1 is a schematic plan view of a contact type electrical power supplying system according to the present invention.

As shown in FIG. 1, a contact type electrical power supplying system (contact charging system) 12 comprises an electric vehicle 14, and an electrical power supplying device 10 that supplies power in a contact manner to the electric vehicle 14 during traveling thereof. The electric vehicle 14 is a vehicle in which there is incorporated an electric motor 16 serving as a drive source, and a driving energy storage device 18 for supplying electrical power to the electric motor 16. The electric vehicle 14, for example, corresponds to an electric automobile, a hybrid vehicle in which an internal combustion engine is incorporated, and a fuel cell vehicle in which a fuel cell is incorporated, or the like.

Figure 6:
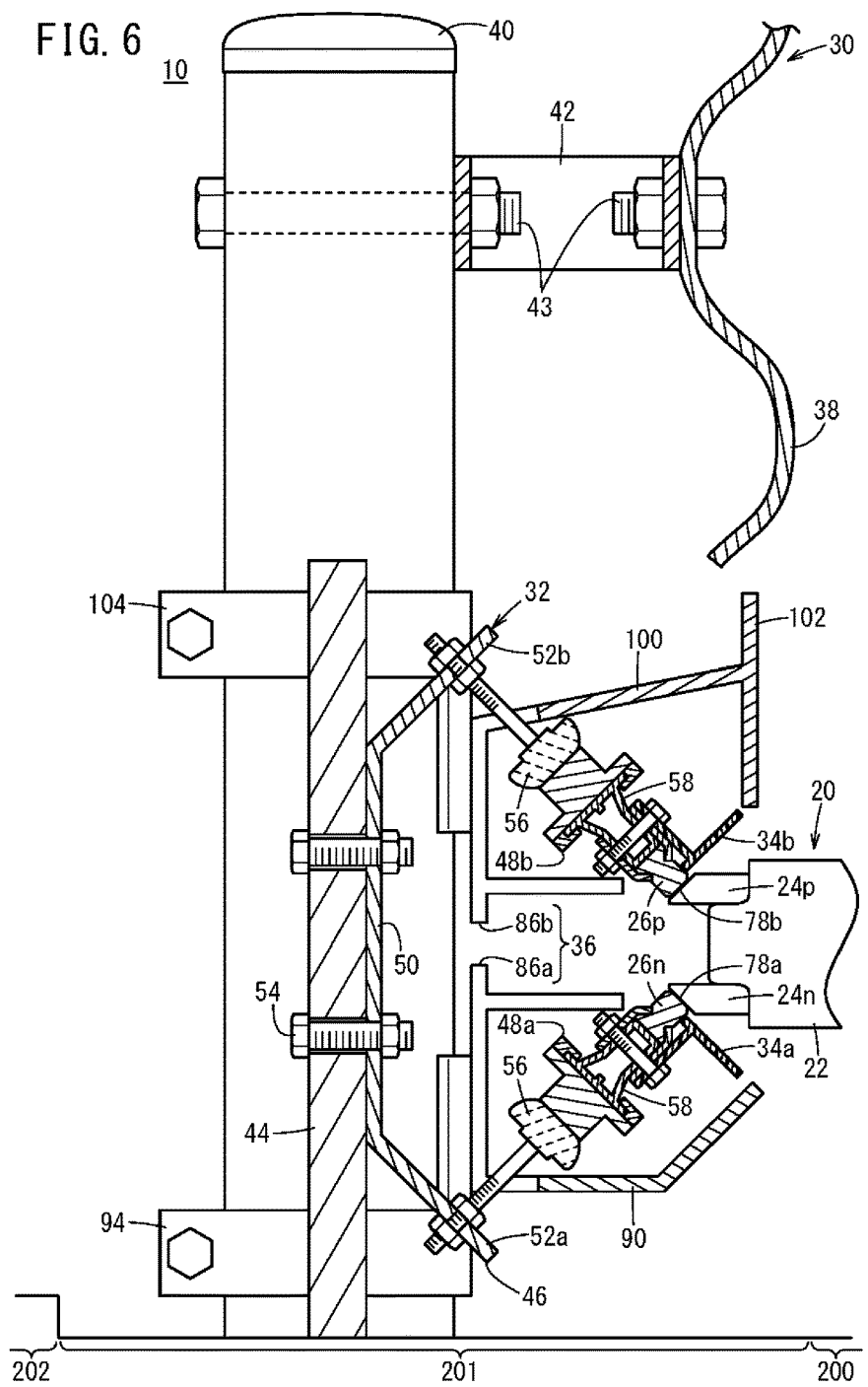
FIG. 6 is a cross-sectional descriptive view showing a condition in which a pair of power receiving elements of an electric vehicle are placed in contact with a pair of power lines.

Further, the electric vehicle 14 includes a charging arm 20 that extends outwardly in a vehicle transverse direction by being deployed from a side portion of one side between the from wheels WF and the rear wheels WR. In FIG. 1, although an example is shown in which the charging arm 20 is disposed on a left side of the electric vehicle 14, the charging arm 20 may also be disposed on the right side of the electric vehicle 14. The charging arm 20 includes a charging head 22 that makes up a distal end thereof. As shown in FIG. 6, the charging head 22 is equipped with a pair of upper and lower power receiving elements 24p, 24n, which are disposed with an interval mutually therebetween.

An upwardly positioned positive side power receiving element 24p and a downwardly positioned negative side power receiving element 24n, respectively, are connected electrically to the energy storage device 18 of the electric vehicle 14 through a non-illustrated cable and an electric circuit. Each of the power receiving elements 24p, 24n is constituted in the form of a truncated cone, and includes a vertically directed axis of rotation. Stated otherwise, the respective power receiving elements 24p, 24n are rotatable.

The electrical power supplying device 10 is disposed at a length of a specified interval on a road shoulder 201 provided on a travel path 200 of an expressway or a general road, or alternatively, on a road shoulder 201 provided on a travel path 200 of a vehicle race track, or the like. Although the length of the specified interval can be set arbitrarily, the length thereof is set to be capable of charging the electric vehicle 14, which has a predetermined rate of electrical consumption, so as to be capable of traveling from a position of one of the electrical power supplying devices 10 to the position of a next one of the electrical power supplying devices 10. According to the present embodiment, a walkway 202 is disposed via the road shoulder 201 on an outer side of the travel path 200 (see FIG. 1).

Figure 2:
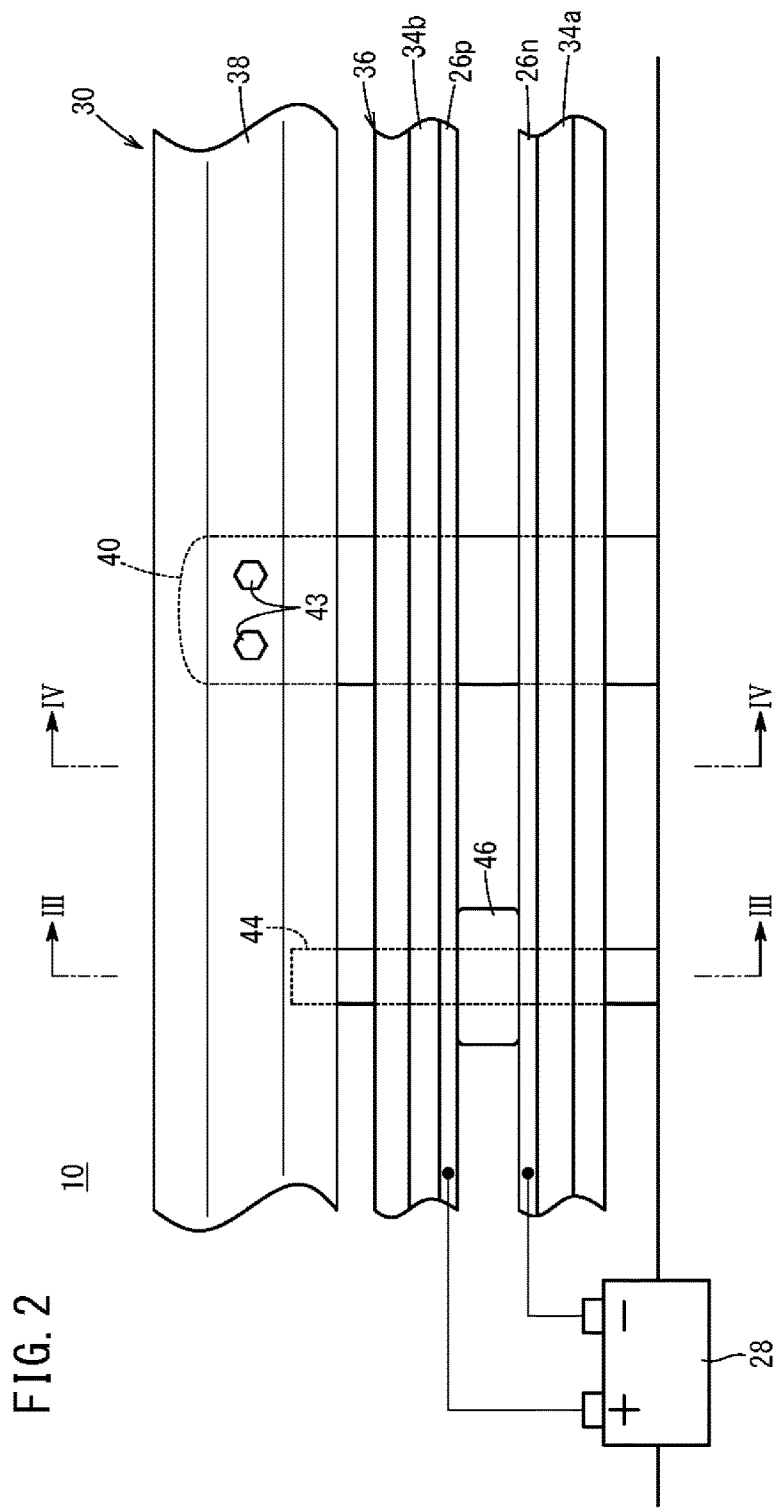
FIG. 2 is a front view with partial omission of an electrical power supplying device that makes up part of the electrical power supplying system.
Figure 3:
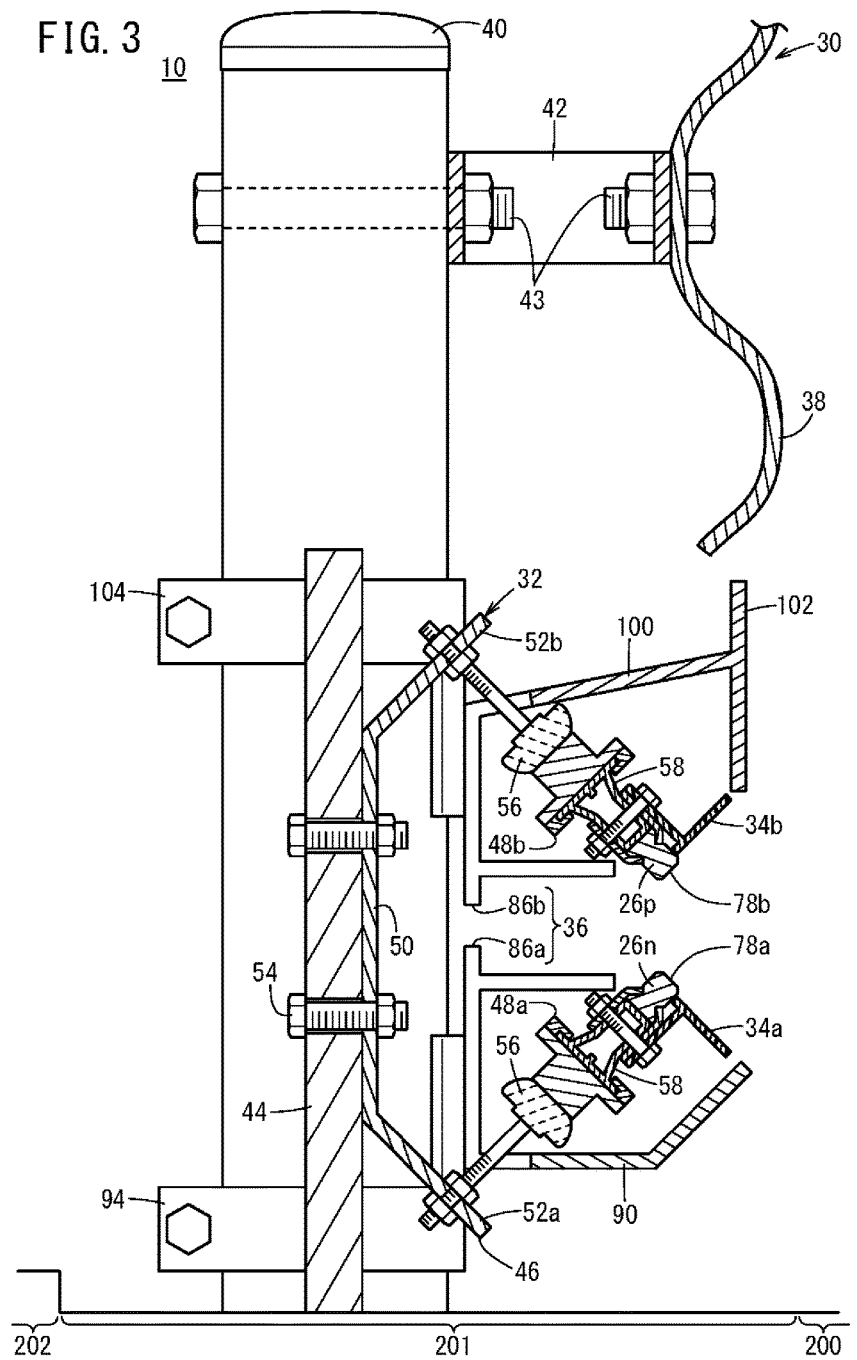
FIG. 3 is a cross-sectional view taken along line III-III of FIG. 2.
Figure 4:
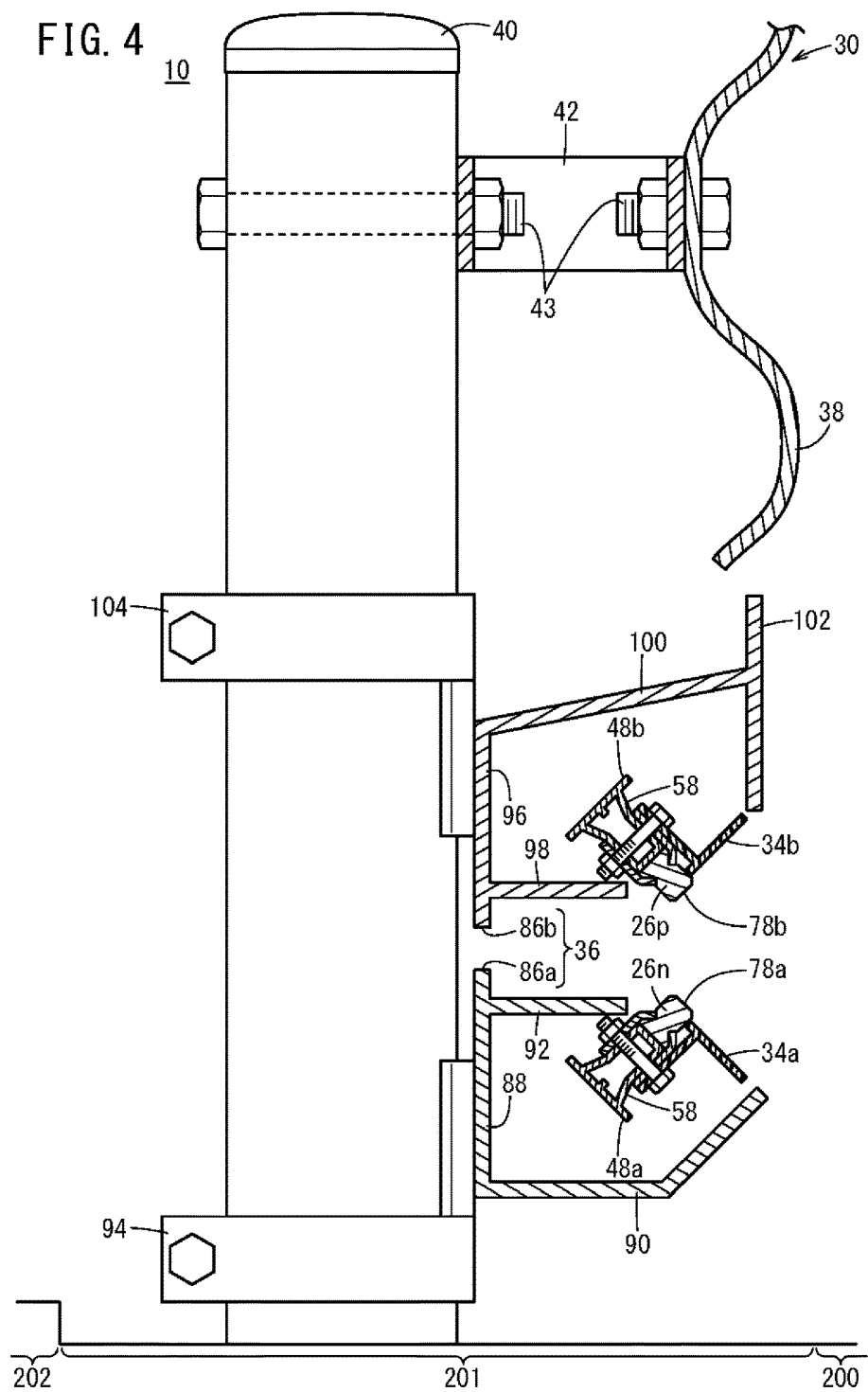
FIG. 4 is a cross-sectional view taken along line IV-IV of FIG. 2.

As shown in FIGS. 2 through 4, the electrical power supplying device 10 is equipped with a pair of upper and lower power lines 26p, 26n disposed at the length of the specified interval along the travel path 200 in a state enabling contact with the pair of power receiving elements 24p, 24n, and a power source 28 that supplies electrical power to the respective power lines 26p, 26n.

A first voltage, which is a high DC voltage, is imposed on the upwardly positioned positive terminal side power line 26p from the power source 28, and a second voltage, which is a fixed DC voltage (reference voltage) of a lower direct current than the first voltage, is imposed on the downwardly positioned negative terminal side power line 26n from the power source 28. More specifically, the respective power receiving elements 24p, 24n are placed in contact with the respective power lines 26p, 26n, whereby electrical power from the power source 28 is supplied to the electric vehicle 14 and is used for charging the energy storage device 18. The power lines 26p, 26n extend roughly horizontally in a state of being separated mutually by a predetermined insulation distance. Further, the respective power lines 26P. 26n are substantially rectangular shaped in cross section.

The electrical power supplying device 10 is equipped with a guard rail 30 disposed along the power lines 26p, 26n, a power line retaining unit 32 in which the power lines 26p, 26n in a pair are retained, a pair of upper and lower guide plates 34a, 34b, and a protective member 36.

The guard rail 30 includes a wavy shaped beam 38, which is positioned at a predetermined height from the road surface and extends at the length of the specified interval along the power lines 26p, 26n, and a plurality of first support posts 40 erected on the road shoulder 201 for supporting the beam 38. The beam 38 is fixed by fastening members 43 such as bolts or the like through respective fittings 42 to the plural first support posts 40, which are disposed at the specified intervals along the direction of extension of the beam 38. Further, as can be appreciated from FIG. 3, the beam 38 is positioned more on the side of the travel path 200 than the respective power lines 26p, 26n.

The power line retaining unit 32 includes a Plurality of second support posts 44 erected on the road shoulder 201, brackets (based members) 46 disposed on each of the second support posts 44, and a pair of lower and upper support members 48a, 48b attached to the brackets 46 and which support the respective power lines 26p, 26n. The plural second support posts 44 are disposed at predetermined intervals along the travel path 200.

Each of the brackets 46 includes a base plate 50 disposed more on the side of the walkway 202 than the respective power lines 26p, 26n, and which is joined to the second support post 44 and extends in the vertical direction, and a pair of retaining plates 52a, 52b provided on the base plate 50. According to the present embodiment, the base plate 50 is joined to the second support post 44 by bolts 54, however, it is a matter of course that the base plate 50 may be joined to the second support post 44 by any arbitrary joining method such as welding or the like.

The retaining plate 52a extends in a downwardly inclined manner toward the side of the travel path 200 from a lower end of the base plate 50. Stated otherwise, the plane of the retaining plate 52a is oriented in an upwardly inclined manner toward the side of the travel path 200. The retaining plate 52b extends in an upwardly inclined manner toward the side of the travel path 200 from an upper end of the base plate 50. Stated otherwise, the plane of the retaining plate 52b is oriented in a downwardly inclined manner toward the side of the travel path 200.

Figure 5:
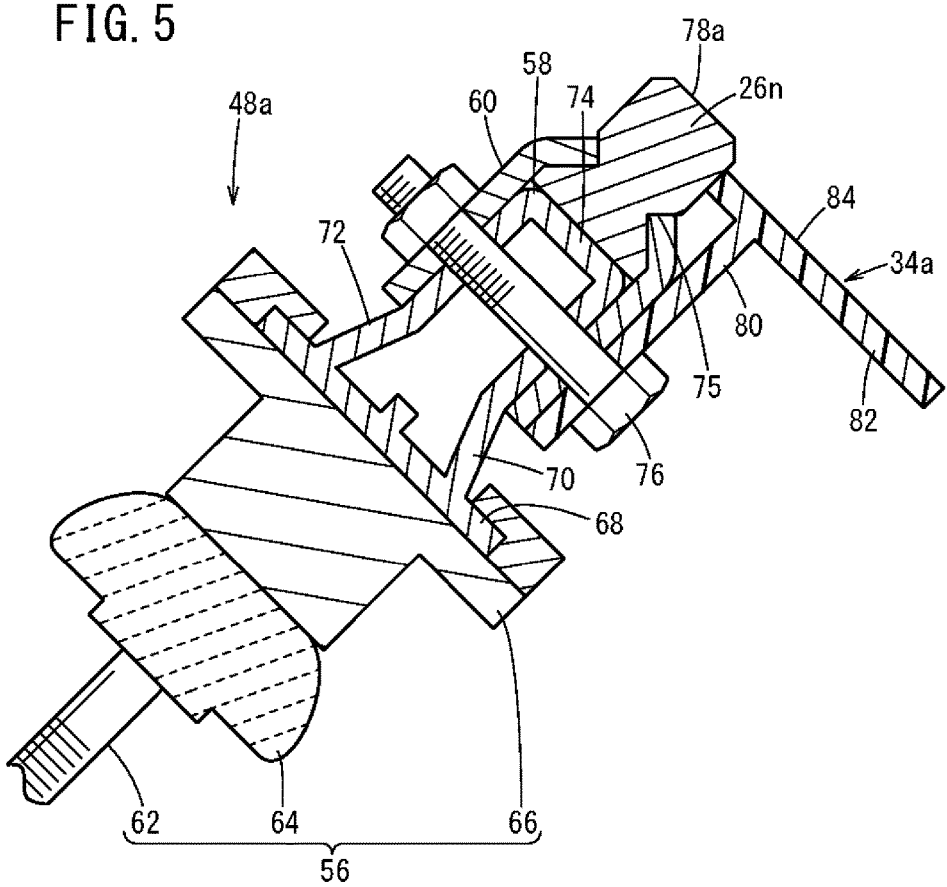
FIG. 5 is an enlarged cross-sectional view with partial omission of a support member that constitutes part of the electrical power supplying device.

As shown in FIG. 5, the downwardly positioned support member 48a serves to support the power line 26n, and includes an insulator 56 disposed on the retaining plate 52a, a power line platform 58 attached to the insulator 56, and a clamp 60 that fixes the power line 26n to the power line platform 58. The insulator 56 comprises an insulating member 64 on which a threaded portion 62 is disposed on a base end side thereof, and a gripping tool 66 fixed to a distal end side of the insulating member 64. The threaded portion 62 is fixed perpendicularly to the plane of the retaining plate 52a. The insulating member 64 is constituted by a ceramic or a resin or the like having an electrical insulating property.

The power line platform 58 extends at the length of the predetermined specified interval along the power line 26n, and includes a flat-shape fixing plate 68 that is gripped by the gripping tool 66, a pair of side plates 70, 72 that extend out from the fixing plate 68, and a mounting plate 74 that contiguously adjoins the side plates 70, 72. The respective side plates 70, 72 extend in an inclined manner so that the interval mutually therebetween narrows from the fixing plate 68 toward the mounting plate 74, and then, extend substantially perpendicularly with respect to the fixing plate 68 to the mounting plate 74. A base end surface of the power line 26n contacts the mounting plate 74.

The clamp 60 extends at the same length along the power line platform 58, and in a state in which the distal end of the clamp 60 is engaged with a constricted portion 75 on the base end side of the power line 26n, the base end portion of the clamp 60 is joined by bolts 76 so as to sandwich the pair of side plates 70, 72 therebetween. As a result, the power line 26n is fixed firmly with respect to the power line platform 58. A contact surface (contact portion) 78a of the power line 26n that is fixed to the power line platform 58 with, respect to the power receiving element 24n is oriented in, an upwardly inclined manner toward the side of the travel path 200.

The upwardly positioned support member 48b has the same structure as that of the above-described support member 48a. Therefore, detailed description of the support member 48b is omitted. Further, by way of the support member 48b, a contact surface (contact portion) 78b of the power line 26p that is fixed to the power line platform 58 with respect to the power receiving element 24p is oriented in a downwardly inclined manner toward the side of the travel path 200.

The downwardly positioned guide plate 34a serves to guide the power receiving element 24n along the power line 26n, and extends at the same length along the power line 26n in a state of being constituted by an insulating material. The guide plate 34a includes an attachment 80, which is joined by the bolts 76 downwardly of the clamp 60 of the support member 48a, and extends slightly below the contact surface 78a of the power line 26n, and a guide section 82, which is disposed on a distal end of the attachment 80, and includes a surface 84 that is disposed substantially in parallel with the contact surface 78a. The guide section 82 abuts against a side surface of the power line 26n. Further, as can be appreciated from FIG. 5, the surface 84 of the guide section 82 is offset more toward the side of the retaining plate 52a than the contact surface 78a of the power line 26n.

The upwardly positioned guide plate 34b serves to guide the power receiving element 24p along the power line 26p and extends at the same length along the power line 26p in a state of being constituted by an insulating material. The guide plate 34b includes the same structure as that of the aforementioned guide plate 34a. Therefore, detailed description of the guide plate 34b is omitted. Further, the attachment 80 of the guide plate 34b is joined upwardly of the clamp 60 of the support member 48b.

The protective member 36 serves to isolate the pair of power lines 26p, 26n from a space (a space on the side of the walkway 202) on the opposite side from the travel path 200 with respect to the electrical power supplying device 10, and extends at the same length along the power lines 26p, 26n. Moreover, a portion of the protective member 36 is cut out at a position corresponding to the power line retaining unit 32 (see FIG. 3). This is for the purpose of avoiding interference between the protective member 36 and the power line retaining unit 32. The protective member 36 comprises a first protective wall 86a provided on the side of the power line 26n, and a second protective wall 86b provides on the side of the power line 26p.

The first protective wall 86a is constituted so as to cover the power line 26n downwardly thereof and from the side of the walkway 202. More specifically, the first protective wall 86a includes a vertical wall 88 that extends along a vertical direction, a lower side wall 90 that extends downwardly of the power line 26n toward the side of the travel path 200 from a lower end of the vertical wall 88, and an inside wall 92 that extends toward the side of the travel path 200 from an upper side portion of the vertical wall 88.

The vertical wall 88 is fixed to the first support posts 40 through a first attachment tool 94. The lower side wall 90, after extending substantially horizontally toward the side of the travel path 200 from the vertical wall 88, extends upwardly in an inclined manner to a position where it does not interfere with the charging head 22 in the vicinity of the guide section 82 that constitutes the guide plate 34a. The inside wall 92 extends substantially horizontally from the vertical wall 88 to a location slightly in front of the power line 26n.

The second protective wall 86b is constituted so as to cover the power lines 26p upwardly thereof and from the side of the walkway 202, and includes a vertical wall 96 that extends along the vertical direction, an inside wall 98 that extends toward the side of the travel path 200 from a lower side portion of the vertical wall 96, an upper side wall 100 that extends upwardly of the power line 26p toward the side of the travel path 200 from an upper end of the vertical wall 96, and a projecting wall 102 that projects in a vertical direction from an end of the upper side wall 100 on the side of the travel path 200.

The vertical wall 96 is fixed to the first support posts 40 through a second attachment tool 104. The inside wall 98 extends substantially horizontally from the vertical wall 96 to a location slightly in front of the power line 26p. The upper side wall 100 extends in an upwardly inclined manner toward the side of the travel path 200 from the vertical wall 96. The angle of inclination of the upper side wall 100 (upper surface of the upper side wall 100) can be set arbitrarily, however, the angle of inclination preferably is set to an angle that allows rainwater to flow toward the side of the walkway 202 due to the inclination of the upper side wall 100, at a time that such rainwater or the like adheres to the upper surface of the upper side wall 100. In accordance therewith, rainwater that adheres to the upper surface of the upper side wall 100 can be guided and discharged toward the side of the walkway 202.

The projecting wall 102 is positioned downwardly of the beam 38 of the guard rail 30, and extends both upwardly and downwardly from an end of the upper side wall 100 on the side of the travel path 200. In accordance therewith, the power lines 26p, 26n are isolated more reliably from the space on the side of the walkway 202, and together therewith, infiltration of rainwater into the power lines 26p, 26n and parts in the vicinity thereof is further suppressed. The lower end of the projecting wall 102 is located at a position where it does not interfere with the charging head 22 in the vicinity of the guide section 82 that constitutes the guide plate 34b.

However, the projecting wall 102 may extend only upwardly, or may extend only downwardly from the end of the upper side wall 100 on the side of the travel path 200. In either of these cases, the power lines 26p, 26n are isolated reliably from the space on the side of the walkway 202, and together therewith, infiltration of rainwater into the power lines 26p, 26n and parts in the vicinity thereof is further suppressed.

With the contact type electrical power supplying system 12 which is constituted in the foregoing manner, in the case that the energy storage device 18 of the electric vehicle 14 is to be charged, the charging arm 20 is deployed from a side portion of the electric vehicle 14 during traveling thereof, and is made to extend outwardly in the vehicle transverse direction. In addition, by bringing the electric vehicle 14 closer in proximity to the side of the power lines 26p, 26n, the charging head 22 of the charging arm 20 is inserted between the pair of upper and lower guide plates 34a, 34b.

At this time, although the charging head 22 is vibrated vertically due to the unevenness of the travel path 200, by the charging head 22 coming into contact with the guide plate 34a or the guide plate 34b, the amplitude of vibration in the vertical direction of the charging head 22 can be minimized. In addition, when the electric vehicle 14 is made to approach closer to the side of the power lines 26p, 26n, the charging head 22 is inserted between the pair of power lines 26p, 26n, together with the pair of power receiving elements 24p, 24n being guided by the guide plates 34a, 34b into contact with the power lines 26p, 26n.

According to the present embodiment, the contact surface 78a of the power line 26n is oriented in an upwardly inclined manner toward the side of the travel path 200, together with the contact surface 78b of the power line 26p being oriented in a downwardly inclined manner toward the side of the travel path 200. Therefore, in a state in which the pair of power receiving elements 24p, 24n and the pair of power lines 26p, 26n are in contact, movement of the charging head 22 in the vertical direction with respect to the electrical power supplying device 10 is limited. Consequently, even if the electric vehicle 14 undergoes vibrations in the vertical direction due to unevenness of the travel path 200, detachment of the pair of power receiving elements 24p, 24n from the pair of power lines 26p, 26n can be suppressed.

When the power receiving elements 24p, 24n in a pair come into contact with the pair of power lines 26p, 26n, electrical power is supplied to the energy storage device 18 from the power source 28 through the power lines 26p, 26n and the power receiving elements 24p, 24n. Moreover, in such a condition, since the power lines 26p, 26n and the bracket 46 are insulated electrically by the insulators 56, charging of the energy storage device 18 can reliably be carried out.

In addition, when the electric vehicle 14 moves away from the electrical power supplying device 10, and the power lines 26p, 26n and the power receiving elements 24p, 24n are no longer in contact, charging of the energy storage device 18 is brought to an end. After charging, the charging arm 20 is folded inward and is stored in the side portion of the electric vehicle 14.

According to the present embodiment, because the contact surface 78a of one of the power lines 26n (on the lower side) is oriented in an upwardly inclined manner toward the side of the travel path 200, and the contact surface 78b of the other of the power lines 26p (on the upper side) is oriented in a downwardly inclined manner toward the side of the travel path 200, it is possible for the pair of power lines 26p, 26n and the pair of power receiving elements 24p, 24n to be brought into contact by entry of the charging head 22 between the pair of power lines 26p, 26n. Consequently, in a state in which the pair of power lines 26p, 26n and the pair of power receiving elements 24p, 24n are in contact, in the case that the electric vehicle 14 is vibrated in a vertical direction due to unevenness of the travel path 200, it is possible for positional shifting in the vertical direction of the power receiving elements 24p, 24n with respect to the power lines 26p, 26n to be suppressed, without especially providing a complex positional shifting suppression mechanism. More specifically, the pair of power receiving elements 24p, 24n can reliably be kept in contact with the pair of power lines 26p, 26n, without causing an increase in the size and complexity of the electrical power supplying device 10 and the charging arm 20.

Further, the insulator 56 that supports the power line 26n is fixed to the retaining plate 52a of the bracket 46, which is disposed on the opposite side (the side of the walkway 202) from the travel path 200 with respect to the pair of power lines 26p, 26n, and similarly, the insulator 56 that supports the power line 26p is fixed to the retaining plate 52b of the bracket 46. Consequently, due to the fact that the respective power lines 26p, 26n are retained at predetermined positions while the respective power lines 26p, 26n and the bracket 46 are insulated electrically by the respective insulators 56, since there is no need for the insulators 56 to extend at the same length along the power lines 26p, 26n, manufacturing costs for the electrical power supplying device 10 can be reduced.

According to the present embodiment, the plane of one of the retaining plates 52a (on the lower side) is oriented in an upwardly inclined manner toward the side of the travel path 200, and the plane of another of the retaining plates 52b (on the upper side) is oriented in a downwardly inclined manner toward the side of the travel path 200. Thus, with a simple structure, the contact surface 78a of the power line 26n can be oriented in an upwardly inclined manner toward the side of the travel path 200, and the contact surface 78b of the power line 26p can be oriented in a downwardly inclined manner toward the side of the travel path 200.

According to the present embodiment, by the Protective member 36, which is equipped with the first protective wall 86a including the vertical wall 88 and the lower side wall 90, and the second protective wall 86b including the vertical wall 96 and the upper side wall 100, the power lines 26p, 26n in a pair are isolated from the space on, the opposite side from the travel path 200 with respect to the electrical power supplying device 10. Consequently, safety of the walkway 202 that is disposed within the space can be ensured.

Further, since the upper surface of the upper side wall 100 is inclined in a downwardly inclined manner toward the side of the walkway 202, rainwater that adheres to the upper surface of the upper side wall 100 can be guided and discharged in a direction toward the walkway 202. Consequently, rusting of the power lines 26p, 26n due to rainwater, and deterioration in the insulating capability between the respective components (for example, between the pair of power lines 26p, 26n) can be prevented.

Furthermore, since the projecting wall 102 is provided on an end of the upper side wall 100 on the side of the travel path 200, the space on the side of the walkway 202 and the power lines 26p, 26n can reliably be isolated from each other (contact by the hands or the like into the power lines 26p, 26n from the space can be prevented), and together therewith, infiltration of rainwater into the power lines 26p, 26n and parts in the vicinity thereof can be suppressed.

According to the present embodiment, since the beam 38 of the guard rail 30 is disposed more on the side of the travel path 200 than the power lines 26p, 26n, a vehicle or the like that travels along the travel path 200 coming into contact with the power lines 26p, 26n can be prevented by the guard rail 30. Further, since the protective member 36 is supported by the guard rail 30, there is no need for a member apart from the guard rail 30 itself to support the Protective member 36. Thus, the structure of the electrical power supplying device 10 can further be simplified.

According to the present embodiment, the power receiving element 24n is guided to the power line 26n by the guide plate 34a, and the power receiving element 24p is guided to the power line 26P by the guide plate 34b. Therefore, the power receiving elements 24p, 24n and the power lines 26p, 26n can easily and reliably be brought into contact.

The present embodiment is not limited to the configuration described above. For example, the brackets 46 of the power line retaining unit 32 may also be fixed to the first support posts 40 of the guard rail 30. In this case since the second support posts 44 of the power line retaining unit 32 are omitted, the structure of the electrical power supplying device 10 can be simplified.

Further, the protective member 36 may be formed integrally with the vertical wall 88 of the first protective wall 86*a* and the vertical wall 96 of the second protective wall 86*b*. In accordance therewith, the walkway 202 and the pair of power lines 26*p*, 26*n* can more reliably be isolated from each other.

The electrical power supplying device and the contact type electrical power supplying system according to the present invention are not limited to the embodiments described above, and it goes without saying that various configurations may be adopted therein without deviating from the essential gist of the Present invention.

The invention claimed is:

1. An electrical power supplying device for supplying electrical power in a contact manner to a pair of power receiving elements of a charging arm that extends outwardly in a vehicle transverse direction from an electric vehicle, comprising:
    a pair of power lines configured to extend along a travel path of the electric vehicle in a state enabling contact with the pair of the power receiving elements, and electrical power being supplied to the power lines;
    a pair of insulators configured to retain the respective power lines; and
    a base member containing a pair of retaining plates to which the respective insulators are fixed, and being disposed on an opposite side from the travel path with respect to the pair of power lines, wherein the base member includes a substantially constant thickness plate having a vertically flat center portion mounted to a post, and upwardly and downwardly inclined portions forming the pair of retaining plates;
    wherein the base member is configured to ensure an insulating distance between the pair of power lines such that the base member is spaced apart from the pair of power lines, and to orient a contact portion of one of the power lines with respect to the charging arm in an upwardly inclined manner toward the side of the travel path, and to orient a contact portion of another of the power lines with respect to the charging arm in a downwardly inclined manner toward the side of the travel path,
    wherein each of the insulators has a length along a longitudinal direction of corresponding one of the power lines, the length of each of the insulators being not the same as a length of the corresponding one of the power lines.

2. The electrical power supplying device according to claim 1, wherein:
    a plane of one of the retaining plates is oriented in an upwardly inclined manner toward the side of the travel path; and
    a plane of another of the retaining plates is oriented in a downwardly inclined manner toward the side of the travel path.

3. The electrical power supplying device according to claim 1, further comprising a protective member configured to isolate the pair of power lines and a space on an opposite side from the travel path with respect to the electrical power supplying device, the protective member further comprising:
    a vertical wall positioned more on an outer side of the travel path than the pair of power lines, and configured to be extended in a vertical direction;
    a lower side wall configured to extend from the vertical wall downwardly of the pair of power lines; and
    an upper side wall configured to extend from the vertical wall upwardly of the pair of power lines.

4. The electrical power supplying device according to claim 3, wherein an upper surface of the upper side wall is inclined in a downwardly inclined manner toward the outer side of the travel path.

5. The electrical power supplying device according to claim 3, wherein the protective member includes a projecting wall configured to project in at least one of upward and downward directions from an end of the upper side wall on a side of the travel path.

6. The electrical power supplying device according to claim 3, further comprising a guard rail including a support post on which the protective member is supported, and being disposed along the power lines.

7. The electrical power supplying device according to claim 1, further comprising guide members configured to guide the pair of power receiving elements of the charging arm toward the pair of power lines.

8. A contact electrical power supplying system, comprising:
    an electric vehicle including a charging arm in which a pair of power receiving elements-are disposed, and which extends outwardly in a vehicle transverse direction; and
    an electrical power supplying device configured to supply electrical power in a contact manner to the pair of power receiving elements;
    the electrical power supplying device comprising:
    a pair of power lines configured to extend along a travel path of the electric vehicle in a state enabling contact with the pair of the power receiving elements, and electrical power being supplied to the power lines;
    a pair of insulators configured to retain the respective power lines; and
    a base member containing a pair of retaining plates to which the respective insulators are fixed, and being disposed on an opposite side from the travel path with respect to the pair of power lines, wherein the base member includes a substantially constant thickness plate having a vertically flat center portion mounted to a post, and upwardly and downwardly inclined portions forming the pair of retaining plates;
    wherein the base member is configured to ensure an insulating distance between the pair of power lines such that the base member is spaced apart from the pair of power lines, and to orient a contact portion of one of the power lines with respect to the charging arm in an upwardly inclined manner toward the side of the travel path, and to orient a contact portion of another of the power lines with respect to the charging arm in a downwardly inclined manner toward the side of the travel path,
    wherein each of the insulators has a length along a longitudinal direction of corresponding one of the power lines, the length of each of the insulators being not the same as a length of the corresponding one of the power lines.

9. The contact electrical power supplying system according to claim 8, wherein:
    a plane of one of the retaining plates is oriented in an upwardly inclined manner toward the side of the travel path; and a plane of another of the retaining plates is oriented in a downwardly inclined manner toward the side of the travel path.

10. The contact electrical power supplying system according to claim 8, further comprising a protective member configured to isolate the pair of power lines and a space on an opposite side from the travel path with respect to the electrical power supplying device, the protective member further comprising:
 a vertical wall positioned more on an outer side of the travel path than the pair of power lines, and configured to be extended in a vertical direction;
 a lower side wall configured to extend from the vertical wall downwardly of the pair of power lines; and
 an upper side wall configured to extend from the vertical wall upwardly of the pair of power lines.

11. The electrical power supplying device according to claim 1, wherein the insulators are mounted by threaded portions.

* * * * *